(12) United States Patent
Kitano et al.

(10) Patent No.: US 6,656,979 B1
(45) Date of Patent: Dec. 2, 2003

(54) ADHESIVE/SEALANT COMPOSITION AND BONDED STRUCTURE USING THE SAME

(75) Inventors: Shuichi Kitano, Sagamihara (JP); Koji Imai, Kanagawa (JP)

(73) Assignee: 3M Innovative Properties Company, St. Paul, MN (US)

(*) Notice: Subject to any disclaimer, the term of this patent is extended or adjusted under 35 U.S.C. 154(b) by 0 days.

(21) Appl. No.: 09/959,107

(22) PCT Filed: May 17, 2000

(86) PCT No.: PCT/US00/13617

§ 371 (c)(1),
(2), (4) Date: Oct. 16, 2001

(87) PCT Pub. No.: WO00/71632

PCT Pub. Date: Nov. 30, 2000

(30) Foreign Application Priority Data

May 20, 1999 (JP) .............................. 11/140204

(51) Int. Cl.⁷ .............................. C08F 2/46; C08F 2/50
(52) U.S. Cl. .............. 522/100; 522/101; 522/178; 522/182; 522/181; 522/168; 522/170; 428/413; 428/414; 428/345; 428/343; 428/349; 428/353; 428/355 R; 428/355 EP; 428/355 AC
(58) Field of Search .............................. 522/100, 101, 522/178, 182, 181, 168, 170; 428/413, 414, 345, 349, 353, 355 R, 355 EP, 355 AC, 500, 343

(56) References Cited

U.S. PATENT DOCUMENTS

| | | | | |
|---|---|---|---|---|
| 5,086,088 A | | 2/1992 | Kitano et al. | 522/170 |
| 5,252,694 A | * | 10/1993 | Willett et al. | 522/13 |
| 5,262,232 A | * | 11/1993 | Wilfong et al. | 428/327 |
| 5,310,840 A | * | 5/1994 | Willett et al. | 526/273 |
| 5,453,450 A | * | 9/1995 | Kinzer et al. | 522/18 |
| 5,593,759 A | * | 1/1997 | Vargas et al. | 428/200 |
| 5,883,193 A | * | 3/1999 | Karim | 525/113 |
| 6,030,701 A | * | 2/2000 | Johnson et al. | 428/343 |
| 2002/0007910 A1 | * | 1/2002 | Bennett et al. | 156/327 |

FOREIGN PATENT DOCUMENTS

| | | | |
|---|---|---|---|
| EP | 798 354 | 10/1997 | |
| EP | 823312 A1 * | 2/1998 | B25B/31/00 |
| EP | 729 494 | 8/1998 | |
| WO | WO 95/13327 | 5/1995 | |
| WO | WO 95/13328 | 5/1995 | |
| WO | WO 96/32453 | 10/1996 | |
| WO | WO 98/21287 | 5/1998 | |

* cited by examiner

Primary Examiner—James J. Seidleck
Assistant Examiner—Sanza L. McClendon
(74) Attorney, Agent, or Firm—Jean A. Lown

(57) ABSTRACT

An adhesive/sealant which is curable by radiation exposure composition having at least one of adhesive and sealant properties and comprising a radiation polymerizable vinyl material, a polymerization initiator for radiation polymerization of the vinyl material, a thermosetting epoxy-containing material and a heat-activatable hardener for the epoxy-containing material.

20 Claims, 4 Drawing Sheets

ADHESIVE/SEALANT COMPOSITION AND BONDED STRUCTURE USING THE SAME

CROSS REFERENCE TO RELATED APPLICATIONS

This application claims priority to International Application No. PCT/US00/13617, filed May 17, 2000, which was published under PCT Article 21(2) in English, and claims priority to Japanese Application No. 11-140204, filed, May 20, 1999, from which PCT/US00/13617 claims priority.

FIELD OF THE INVENTION

The present invention relates to adhesive/sealant compositions, and more particularly to an adhesive/sealant composition used for sealing a joint, a step, a bond portion, a seam portion, a crack portion or other portions (hereinafter these portions being referred to as "discontinuous portions") of vehicles, for example, and a bonded structure in which the adhesive/sealant composition is used.

BACKGROUND OF THE INVENTION

Vehicles such as automobiles and trucks have discontinuous joints formed by overlapping metal panels. The discontinuous joints are usually sealed with a sealant. One example of a common non-planar overlapping type joint is represented by a roof ditch formed in the front and back direction of a vehicle by bending the edges of the roof panel and side panels thereof and overlapping the bent portions. The roof ditch has a U-shaped channel, which also plays the role of collecting and discharging water, etc.

The sealant is supplied as a liquid or paste material in response to the requirement of execution of works. For example, in the automobile industry, a joint is usually sealed with a liquid plastisol. However, when the sealant is in a liquid state, there are areas in the roof ditch where the slope of the ditch makes it difficult to apply a liquid. Additionally, pastes need to be spread in the ditch by the operator and requires a certain level of skill to produce a seal that is aesthetically pleasing as well as functional. Accordingly, a sealant showing tackiness, having a definite shape and being molded in, for example, a sheet-like form must be used in some cases.

A heat-fusible and flowable adhesive tape has been used as a molded sealant. Adhesive compositions for such a tape are disclosed in, for example, U.S. Pat. No. 5,086,088, National Unexamined Patent Publication (Kohyo) No. 9-505334 and European Patent No. 798,354. The adhesive compositions contain an epoxy-containing material capable of being thermoset and an acrylic component having a nitrogen atom within the molecule.

However, when the acrylic component contains a nitrogen atom as explained above, the nitrogen atom generally enhances the polarity, and as a result the sealant, namely, the adhesive composition is hydrophilic. Thus, the adhesive composition tends to absorb moisture. Such moisture absorption is particularly significant, for example, in the coating line of automobiles in summer when the line is subjected to high temperature and humidity. Moisture absorption may also take place in winter as well due to dew condensation.

When a sealant that has absorbed moisture is applied to a roof ditch, the sealant foams and expands upon heating due to the absorbed water. As a result, the adhesive/sealant composition may not bond sufficiently to a discontinuous portion to cause lamination, or it may be lifted. Such delamination or lifting not only allows intrusion of dust, moisture and other undesirable components, but also causes a poor coating appearance and deteriorated bonding with an applied coating (e.g., automobile grade primer for paint).

On the other hand, National Unexamined Patent Publication (Kohyo) No. 9-505095 discloses a sealant containing a photo-copolymer having low affinity with moisture and an epoxy-containing material capable of being thermoset. For such a sealant, the photo-copolymer is selected so that the epoxy-containing material has compatibility with the photo-copolymer and so that the sealant can be applied to such an adherend having a low surface energy as a steel sheet having an oily surface. Therefore, a coating (e.g., a primer, paint, etc.) applied to the sealant adheres to the sealant only with insufficient strength. In extreme cases, such a sealant may repel the coating.

WO 98/21287 relates to thermosettable adhesive and photopolymerizable precursor of a pressure-sensitive thermosettable adhesive, which are useful for bonding plastic substrates to other substrates.

WO 96/32453 relates to a method for imparting topographical or protective features to a substrate by contacting a sheet material comprising a thermosettable layer with a substrate and heating the sheet material.

SUMMARY OF THE INVENTION

The adhesive/sealant composition of the present invention can have a desired appearance upon being coated (e.g., painted) and can have solvent resistance while effectively sealing a discontinuous portion with reduced moisture absorption.

In addition, the adhesive/sealant composition of the present invention can resist absorbing water upon exposure to high humidity before thermoset curing and thus can provide a smooth surface appearance and effective seal after curing.

In one aspect of the present invention, an adhesive/sealant composition having at least one of adhesive and sealing properties is provided. The adhesive/sealant composition comprises a radiation polymerizable vinyl material containing a vinyl type monomer which can exhibit a solubility parameter of 10 to 14 $(cal/cm^3)^{0.5}$, more preferably 10 to 12 $(cal/cm^3)^{0.5}$, when the monomer is polymerized to a homopolymer, a polymerization initiator for radiation polymerizing the vinyl material, a thermosetting epoxy-containing material and a heat-activatable hardener for the epoxy-containing material.

Preferably the radiation-polymerizable vinyl material contains a vinyl type monomer capable of exhibiting a solubility parameter of 10 to 14 $(cal/cm^3)^{0.5}$, and more preferably 10 to 12 $(cal/cm^3)^{0.5}$, when the vinyl type monomer is polymerized to a homopolymer.

In another aspect, the present invention relates to a bonded structure comprising an adherend having a discontinuous portion, and an adhesive/sealant composition which seals the discontinuous portion of the adherend, in which the adhesive/sealant composition is that of the present invention.

In still another aspect thereof, the present invention relates to a bonded structure comprising an adherend having a discontinuous portion, a plasticizer-containing plastisol which is applied to the discontinuous portion to seal the portion, and an adhesive/sealant composition which is at least partially provided onto the plastisol, in which the adhesive/sealant composition is that of the present invention.

DETAILED DESCRIPTION OF THE INVENTION

Embodiments of the present invention will be explained below in detail. Those skilled in the art will readily understand that the present invention is not restricted to the embodiments described below.

The adhesive/sealant composition according to the present invention comprises the following four components:

(1) a radiation-polymerizable vinyl material which is curable by radiation exposure;

(2) a polymerization initiator for radiation polymerization of the vinyl material;

(3) a thermosetting epoxy-containing material; and (4) a heat-activatable hardener for the epoxy-containing material.

The adhesive/sealant composition of the present invention can have humidity resistance before curing. The radiation-polymerizable vinyl material used as the first component in the adhesive/sealant composition of the present invention contains a vinyl type monomer which can exhibit a solubility parameter (SP) of 10 to 14 $(cal/cm^3)^{0.5}$, more preferably 10 to 12 $(cal/cm^3)^{0.5}$, when it becomes a homopolymer, that is, a monomer which has a vinyl group within the molecule and which can participate in radiation polymerization. To provide humidity resistance prior to curing, the vinyl type monomer preferably has little to no polar/hydrophilic groups within the monomer, including few to no nitrogen groups within the monomer. The term "radiation" herein is used in a broad sense, and includes various types of radiation which can cause polymerization of the vinyl material. Specifically, the radiation includes UV-rays and electron-beam rays. Moreover, the term "solubility parameter (SP)" is defined by the following formula:

$$\delta = \left[ \frac{\sum_i \Delta e_i}{\sum_i \Delta v_i} \right]^{\frac{1}{2}}$$

wherein $\Delta e_i$ represents an evaporation energy of each of the atoms or functional groups forming the homopolymer, and $\Delta v_i$ represents a volume of each of the atoms or functional groups forming the homopolymer. Note, details of the definition of the solubility parameter refer to *Polymer Engineering and Science*, February 1974, Vol. 14, No. 2, "A Method for Estimating Both the Solubility Parameters and Molar Volumes of Liquid," by Robert F. Fedors.

As a result of polymerization by radiation exposure, the vinyl material as the first component can give the adhesive/sealant composition a definite shape and, if necessary, tackiness. That is, the vinyl type monomer in the vinyl material can give the adhesive/sealant composition not only a definite shape but also tackiness. When the adhesive/sealant composition displays tackiness, positioning thereof can be conducted easily for the following reasons: the operator need not use a brush for flattening in contrast to the conventional plastisols and a joint can be covered therewith. In particular, the adhesive/sealant composition can be molded in the form of a sheet, a rope, a tape or a strip. Moreover, in order to mold the adhesive/sealant composition in such a definite form, the homopolymer of the vinyl type monomer in the vinyl material preferably has a glass transition temperature (Tg) of −25 to 200° C.

The vinyl material preferably is contained in an amount of 40 to 250 parts by weight based on 100 parts by weight of the epoxy-containing material. When the content of the vinyl material becomes less than about 40 parts by weight, the adhesive/sealant composition has difficulty holding a definite shape to be effective as a molded sealant, and tends to become brittle. On the other hand, when the content of the vinyl material exceeds about 250 parts by weight, the thermoset adhesive/sealant composition is not sufficiently crosslinked, and the heat resistance and final adhesiveness tend to deteriorate.

Furthermore, the vinyl type monomer capable of exhibiting a solubility parameter of 10 to 14 $(cal/cm^3)^{0.5}$, more preferably 10 to 12 $(cal/cm^3)^{0.5}$, when it becomes a homopolymer must account for 50 to 100% of the entire vinyl material. When the content of the vinyl type monomer is in the range mentioned above, the vinyl monomer can be mixed to a desirable degree with a thermosetting epoxy containing material which is a third component of the adhesive/sealant composition, as explained in detail below. Also, desirable mixing of the vinyl monomer with other components contained in the adhesive/sealant composition to accelerate thermosetting of the epoxy-containing material can be achieved. Moreover, in addition to the solubility parameter of 10 to 14 $(cal/cm^3)^{0.5}$, more preferably 10 to 12 $(cal/cm^3)^{0.5}$, as explained above, the vinyl type monomer preferably has a solubility in water at 25° C. of not more than 0.2% by weight because the adhesive/sealant composition is then given excellent moisture resistance.

Preferred examples of the vinyl type monomer described above include 2-phenoxyethyl acrylate, benzyl acrylate, phenyl acrylate, phenylethyl acrylate, dicyclopentenyl acrylate, dicyclopentenyloxyethyl acrylate, and tricyclo[5,2,1]decanyl (meth)acrylate. These monomers may be used alone or in mixtures thereof More preferably, 2-phenoxyethyl acrylate, benzyl acrylate, phenyl acrylate, and mixtures thereof can be used as the vinyl type monomer. These vinyl type monomers are commercially available, for example, as "Viscoat #192™" and "Viscoat #160™" (trade names, produced by Osaka Organic Chemical Industry Ltd.).

The excellent moisture resistance of the adhesive/sealant composition derived from the use of vinyl type monomers as explained above makes quality control of the adhesive/sealant composition easy. Storage of the adhesive/sealant composition within a desiccator or preservation thereof with a drying agent to prevent it from being subjected to dew condensation in winter is not required. Moreover, for example, even when the adhesive/sealant composition is left at high temperature and high humidity before thermnosetting of the epoxy-containing material, the adhesive/sealant composition does not absorb a substantial amount of moisture.

The automobile industry is referred to as one example for the use of the adhesive/sealant composition. When the production line is stopped on holidays, the adhesive/sealant composition applied to automobile parts can remain affixed thereto without thermosetting. In particular, the adhesive/sealant composition is sometimes subjected to high ambient temperature and high ambient humidity over a long period of time during the long summer vacation. Use of the adhesive/sealant composition of the present invention substantially avoids undesirable expansion of the adhesive/sealant composition due to absorption of moisture when the production line operation is started again after a long stop and the automobile parts to which the adhesive/sealant composition is affixed are passed through a heating booth and a coating booth. The undesirable effect is avoided for the following reason: the amount of moisture absorbed by the adhesive/sealant composition is so small that there is very little expansion of the composition when it is subsequently heated. The adhesive/sealant composition of the present invention, therefore, absorbs virtually no moisture, and maintains adhesion to a discontinuous portion such as a joint even when subjected to heat.

In the practice of the present invention, an additional vinyl type monomer, other than the vinyl type monomers mentioned above, may be used in the vinyl material, in combination therewith, if necessary. Although there is no specific restriction, examples of the vinyl type monomer which can be additionally used include (meth)acrylic acid esters having an alkyl group represented by 2-ethylhexyl acrylate, butyl acrylate and ethyl acrylate, or isobornyl (meth)acrylate, glycidyl (meth)acrylate, hydroxyethyl (meth)acrylate, ethoxyethyl (meth)acrylate, (meth)acrylic acid, 2-methoxyethyl (meth)acrylate and vinyl acetate.

In one embodiment of the invention in which the adhesive/sealant composition has a definite shape such as an elongated strip, or it is desired that it melt and flow at the time of heating as described above, the vinyl material preferably can contain as the monomer component a monofunctional vinyl monomer having one vinyl group within the molecule. In an alternative embodiment, when the adhesive/sealant composition is intended to have a definite shape over a longer period of time or when an adherend such as a roof molding clip is intended to be held high at the time of thermosetting of the adhesive/sealant composition, a multifunctional vinyl monomer having at least two vinyl groups within the molecule is preferred. Examples of such a multifunctional vinyl monomer include 1,4-butanediol diacrylate and 1,6hexanediol diacrylate. Finally, a mixture of the two types of vinyl monomers may be used to provide a tape that has more flow, but maintains its shape. Usually, such a multifunctional vinyl monomer is contained preferably in an amount of 0 to 5 parts by weight based on 100 parts by weight of the vinyl material.

The vinyl type monomer used in the vinyl material of the adhesive/sealant composition in the present invention preferably contains little to no polar/hydrophilic groups within the monomer, including nitrogen, as explained previously. However, the vinyl material may include a limited amount of hydrophilic/polar monomers as long as the amount of these monomers is small enough that it does not interfere with the humidity resistance of the adhesive/sealant composition, for example, in an amount up to approximately 10%. For example, the vinyl material may include a nitrogen-containing vinyl type monomer such as N,N-dimethylacrylamide, N-vinylcaprolactam, N-vinylpyrrolidone, acryloylmorpholine and acrylonitrile to increase the compatibility of the vinyl material with the epoxy-containing material so long as the humidity resistance is satisfied. For example, from 0 to 10 parts by weight of the nitrogen-containing vinyl type monomer may be contained based on 100 parts by weight of the vinyl material. These hydrophilic/polar type monomers may contribute to properties such as adhesion for ED-paint, for miscellaneous plastics, bulk properties, and the like.

The adhesive/sealant composition of the present invention contains a polymerization initiator as a second component for the radiation polymerization of the radiation-polymerizable vinyl material as mentioned above. The polymerization initiator used herein is preferably one which generates free radicals upon irradiation of radiation such as UV-rays. An example of a suitable polymerization initiator is 2,2-dimethoxy-1,2-diphenylethane-1-one which is commercially available from Ciba-Geigy (trade name of "Irgacure™ 651").

The adhesive/sealant composition may further contain a chain transfer agent, in addition to the polymerization initiator described above, to lower the molecular weight of the polymer formed by radiation polymerization of the vinyl material. Addition of the chain transfer agent can adjust the molecular weight of the polymer of the vinyl material and give the adhesive/sealant composition suitable melting and flowing properties. For example, halogenated hydrocarbons such as carbon tetrachloride, or sulfur compounds such as lauryl mercaptan, butyl mercaptan, ethanethiol, 2-mercaptoether and 3-mercaptopropionic acid can be used as the chain transfer agent.

The thermosetting epoxy-containing material used as a third component in the adhesive/sealant composition of the present invention can contribute to the improvement of the final bonding properties and heat resistance thereof. The epoxy-containing material which can be advantageously used herein is an epoxy resin containing at least one oxirane ring which can be polymerized by a ring opening reaction. Such an epoxy-containing material is called an "epoxide" in a broad sense and contains a monomeric epoxide and polymeric epoxides, and may become aliphatic, alicyclic or aromatic. Such an epoxy-containing material can generally contain two epoxy groups on the average, appropriately at least two epoxy groups permolecule. Such a material is specifically called a polyepoxide, and includes an epoxy-containing material having an epoxy functionality slightly smaller than 2.0, for example, 1.8. The average number of epoxy groups per molecule is defined as a number obtained by dividing the number of epoxy groups in the epoxy-containing material by the total number of epoxy molecules. Polymer epoxides include a linear polymer having epoxy end groups, (e.g., diglycidyl ether of a polyalkylene glycol) and a polymer having a skeletal oxirane unit (e.g., polybutadiene polyepoxide). The molecular weight of the epoxy-containing material may range from about 5.8 to 100,000. Further, a mixture of various epoxy-containing materials can also be used.

Examples of the thermosetting epoxy-containing material suitable as a third component in the practice of the present invention include in particular a bisphenol A type epoxy resin; a bisphenol AD type epoxy resin; a bisphenol F type epoxy resin; a phenol novolac type epoxy resin; a cresol novolac type epoxy resin; an alycyclic epoxy resin; a heterocyclic ring-containing epoxy resin such as triglycidyl isocyanate and hydantoin epoxy; aromatic or aliphatic epoxy resins such as a hydrogenated bisphenol A type epoxy resin, propylene glycol-diglycidyl ether copolymer and pentaerythritol-polyglycidyl ether copolymer; an epoxy resin obtained by the reaction of an alicyclic carboxylic acid and epichlorohydrin; a spiro ring-containing epoxy resin; a glydidyl ether type epoxy resin which is a reaction product of an o(ortho)-allylphenol novolac compound with epichlorohydrin; and a glycidyl ether type epoxy resin which is a reaction product of a diallylbisphenol compound having allyl groups located at positions ortho to the hydroxyl groups of bisphenol A with epichlorohydrin.

The heat-activatable hardener as a fourth component is contained in order to thermoset the thermosetting epoxy-containing material. The heat-activatable hardener is appropriately designed so that it is thermally activated and the adhesive/sealant composition is cured when the adhesive/sealant composition is subjected to a suitable heat source for a suitable period of time. That is, the heat-activatable hardener has potential thermosetting properties at room temperature, but is thermally activated only by heating, thereby controlling the thermosetting of the epoxy-containing material. Although appropriate heat-activatable hardeners are not restricted to the compounds mentioned below, examples include: dicyandiamide, an organic acid hydrazide, an acid anhydride, a salt of a Lewis acid or BrØnsted acid, an imidazole, a tertiary amine such as a urea derivative, and mixtures thereof.

Described in detail, a typical example of an organic acid hydrazide used as a heat-activatable harder is adipic acid dihydrazide. Typical examples of an acid anhydride include phthalic anhydride, trimellitic anhydride and pyromelitic anhydride. Typical examples of a salt of Lewis acid or BrØnsted acid include monoethylamine of boron trifluoride and piperidine of boron trifluoride. Typical examples of imidazoles include 2,4-diamino-6-[2'-methylimidazole-(1')]-ethyl-s-triazine, 2,4-diamino-6-[2'-methylimidazole-(1')]-ethyl-s-triazine-isocyanurate, 2-phenyl-4-benzyl-5-hydroxyethylimidazole and nickel imidazole phthalate. Typical examples of a tertiary amine such as a urea derivative include 3-phenyl-1,1-dimethyl urea and 3-p-chlorophenyl-1,1-dimethyl urea. Of the heat-activatable hardeners mentioned above, tertiary amines such as imidazoles and urea derivatives usually are not used alone. These compounds can be used in combination with dicyandiamide, an organic acid hydrazide or an acid anhydride to function as a heat activatable hardner.

Further, the adhesive/sealant composition of the present invention may also contain, additives. These additives may include: a filler composed of powder such as calcium carbonate, silica, alumina or talc; a fine spherical filler such as silica; a plasticizer composed of a phthalic acid derivative; an adipic acid derivative or liquid rubber; an antioxidant, a surfactant; or an antifoamer composed of polydimethylsiloxane. These additives may be useful when the adhesive/sealant composition of the present invention is used as a sealant.

The adhesive/sealant composition of the present invention may further contain, if necessary, a woven fabric or an unwoven fabric. These materials may be impregnated with the adhesive/sealant composition before the composition comes to have a definite shape by radiation polymerization of the vinyl material, to enhance the cohesive force of the adhesive/sealant composition particularly in the longitudinal and transverse directions, and to make slitting and punching easy so that the workability of the adhesive/sealant composition is improved. Examples of useful woven and unwoven fabrics are those prepared from natural or synthetic polymer fibers such as polyester, nylon, cotton, polypropylene, cellulose acetate or acetate, or compounded material of these substances.

As explained above, the adhesive/sealant composition according to the present invention can be used in combination with the adherend having a discontinuous portion to provide a bonded structure. Although the bonded structure of the present invention can have various embodiments, typical embodiments thereof will be illustrated with reference to FIGS. 1 to 4.

Figure 1:
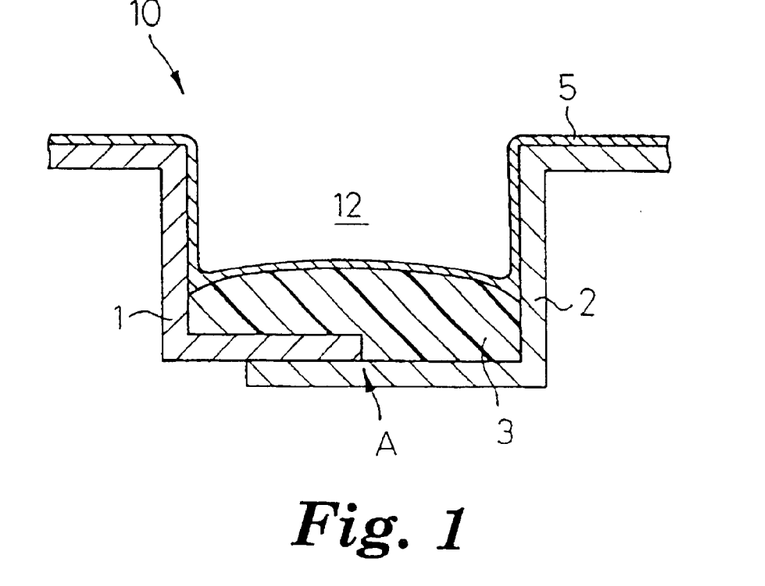
FIG. 1 is a cross-sectional view showing a preferred embodiment of a bonded structure according to the present invention.

FIG. 1 is a cross-sectional view schematically showing one embodiment of the bonded structure according to the present invention using the adhesive/sealant composition of the present invention. In FIG. 1, two panels 1 and 2 are each vertically worked to form a U-shaped channel called as a roof ditch which is used as an adherend herein. An adhesive/sealant composition 3 of the present invention is applied to the joint A to give a bonded structure 10. For better understanding of the present invention, the roof ditch will be further explained. In general, the roof ditch is found in a vehicle such as an automobile and in particular a truck. As shown in FIG. 1, the roof ditch is formed in the front and back direction of the vehicle by bending the edge of the roof panel 1 and the edge of the side panel 2, overlapping both edges and bonding the overlapped portion by welding. Accordingly, the roof ditch has the joint A as a discontinuous portion, which is covered with the adhesive/sealant composition 3 of the present invention as a sealant on the side of the roof channel 12. Since the joint A is covered with the sealant, corrosion of the joint A caused by the entering of moisture, dust, and the like, and other undesirable components is prevented. Moreover, for the bonded structure shown in FIG. 1, a coating layer 5 is further applied onto the adhesive/sealant composition 3.

As explained above, the adhesive/sealant composition of the present invention is molded to have a definite shape such as a sheet-like form by irradiation of radiation. It may have tackiness, if necessary, to achieve pressure-sensitive adhesion to the joint.

Furthermore, the molded adhesive/sealant composition becomes molten and flowable in the following step to seal the joint. Accordingly, the adhesive/sealant composition can act as a "sealant". That is, when the adhesive/sealant composition is heated while covering the joint, it is softened, and thereby can come in close contact with the surface of the discontinuous portion. This process can push out trapped air. Thereafter, the adhesive/sealant composition is cured by heating (namely, crosslinking with covalent bond), as practiced, for example, in the coating step of automobiles, because the epoxy-containing material has thermosetting properties. Therefore, the adhesive/sealant composition does not flow even when it is cooled and reheated in the subsequent steps.

As explained above, the adhesive/sealant composition of the present invention can decrease moisture absorption regardless of whether or not the composition is cured. The adhesive/sealant composition can, therefore, prevent defect formation caused by its behavior as a sealant in the coating step of automobiles where the adhesive/sealant composition is melted, allowed to flow and cured. For example, it can prevent poor appearance of coating, poor sealing of the joints and poor bonding.

Furthermore, even when the adhesive/sealant composition of the present invention is used in combination with a liquid sealing composition mainly containing a polyvinyl chloride and a plasticizer (plastisol, hereinafter referred to as a "sealer" so that it can be distinguished from the "sealant" of the present invention), the behavior-caused defects as mentioned above can be prevented because migration of the plasticizer contained therein to the interface between the liquid sealer and the adhesive/sealant composition is suppressed.

Figure 2:
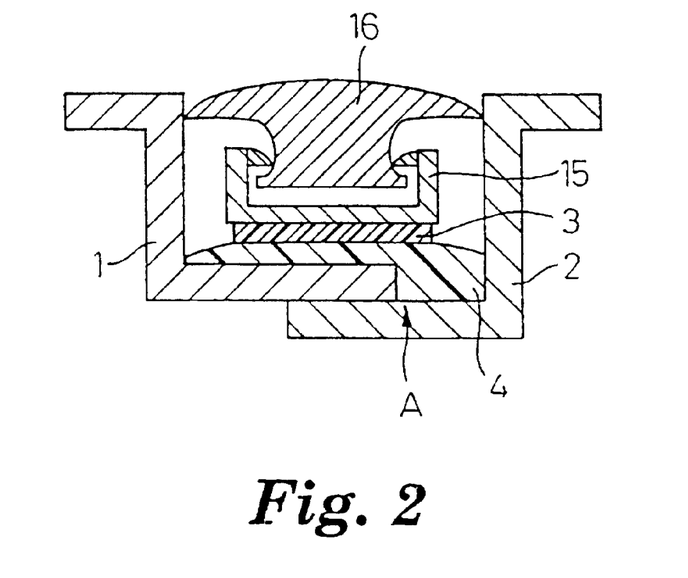
FIG. 2 is a cross-sectional view showing another preferred embodiment of a bonded structure according to the present invention.
Figure 3:
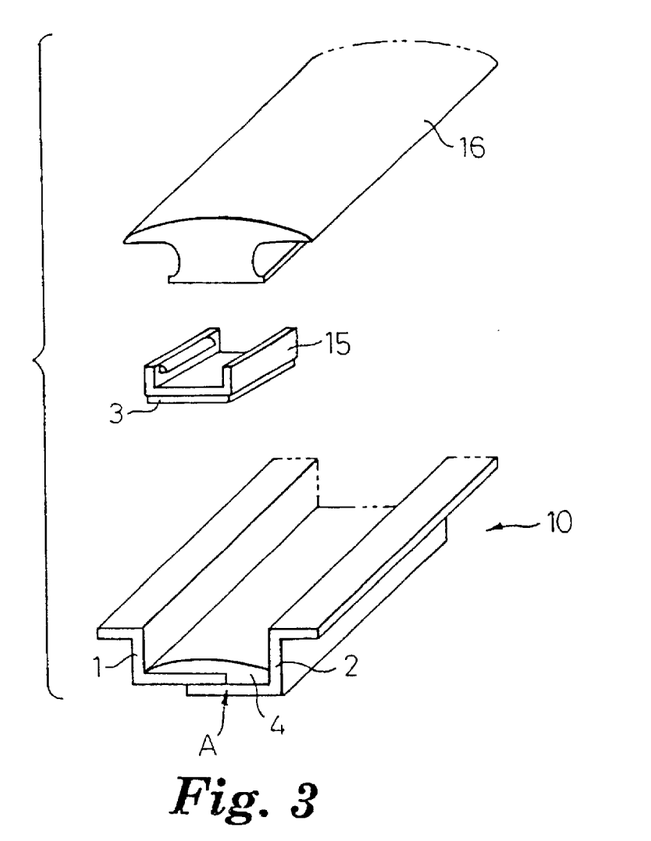
FIG. 3 is a perspective developed view showing the construction of the bonded structure shown in FIG. 2.

Use of the sealant and sealer, in combination, in the bonded structure can be explained by making reference to FIGS. 2 and 3 showing an embodiment in which a roof molding for decoration composed of a molded article is attached to a roof ditch. FIG. 2 shows a bonded structure which is an embodiment of the present invention different from that in FIG. 1 and in which a roof molding 16 is fitted into, for example, a U-shaped clip 15 to be attached to the roof ditch 10. For the bonded structure shown in FIG. 2, a joint A of the roof ditch formed from a roof panel 1 and a side panel 2 is coated with a liquid sealer 4. Further, an adhesive composition (sealant) 3 of the present invention having been molded is affixed to the bottom of the clip 15. The adhesive/sealant composition 3 is closely contacted with the liquid sealer 4. However, for such a bonded structure, defect formation caused by the behavior of the sealant is prevented for reasons as explained above. That is, the adhesive/sealant composition can maintain a definite shape over a long period of time, or it can hold a substrate such as a roof molding clip high during thermosetting. Note, as the clip material, a plastic material such as polybutylene phthalate or a metal material such as stainless steel can be used herein, for example.

FIG. 3 is shown for better understanding of the production of the bonded structure illustrated in FIG. 2. FIG. 3 is a developed illustration of the bonded structure shown in FIG. 2, obtained by dissembling it into the roof molding 16, the clip 15 and the roof ditch 10. As explained above, the roof ditch 10 having the joint A is formed in the front and back direction by overlapping and bonding the roof panel 1 and the side panel 2. The joint A is subsequently coated with the liquid sealer 4 while the sealer 4 is being flattened with a brush, a knife, or the like. Further, for example, the U-shaped clip 15 with the adhesive/sealant composition 3 is placed onto the applied liquid sealer 4 contacting the adhesive/sealant composition 3 with the liquid sealer 4. In the automobile industry, a precuring step and a coating step are practiced in such a state to realize the sealing of the liquid sealer and the adhesiveness of the adhesive/sealant composition. The roof molding 16 is fitted into the clip 15 in the subsequent outfitting step.

Figure 4:
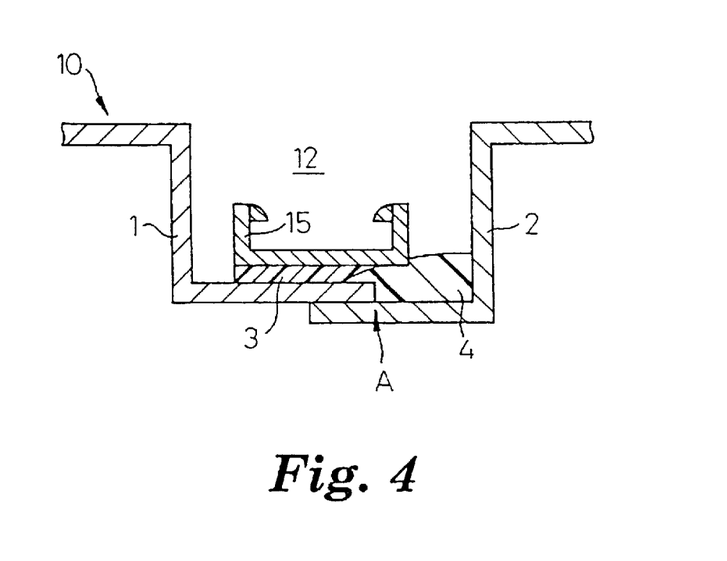
FIG. 4 is a cross-sectional view showing another preferred embodiment of a bonded structure according to the present invention.

FIG. 4 shows one modified embodiment of the bonded structure 1 shown in FIGS. 2 and 3 in which the sealant and the sealer are used in combination. That is, the adhesive/sealant composition (sealant) 3 is provided onto the liquid sealer 4. A roof molding (not shown) is accommodated in the roof channel 12, and attached to the roof ditch 10 through the clip. 15 with the adhesive/sealant composition 3.

Figure 5:
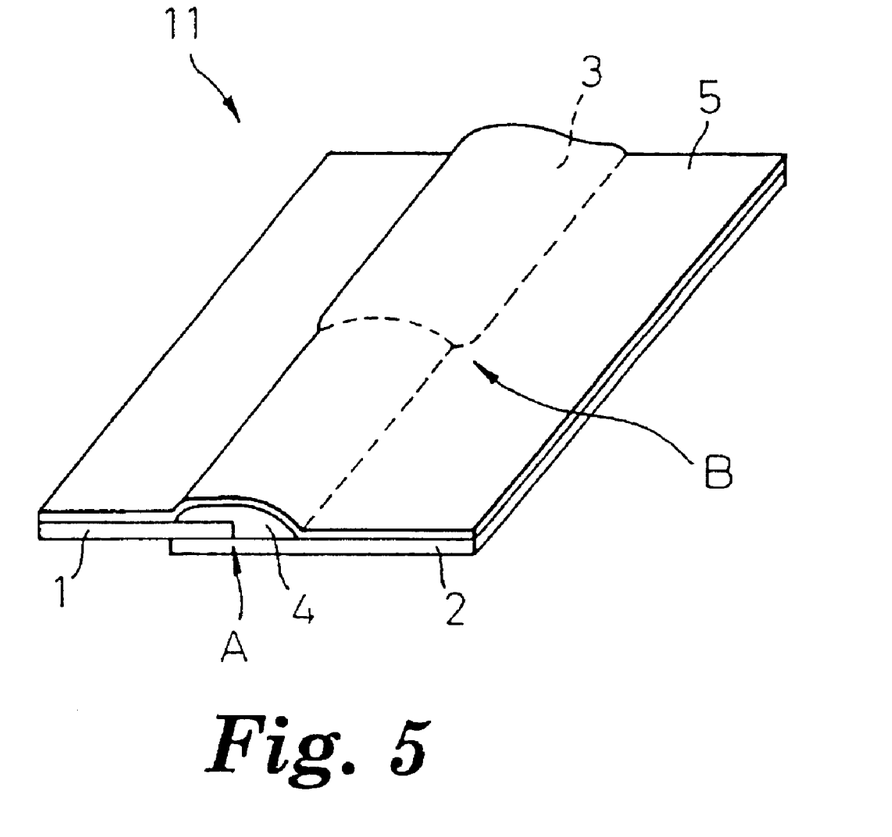
FIG. 5 is a perspective view showing still another preferred embodiment of a bonded structure according to the present invention.

FIG. 5 is a perspective view of still another preferred embodiment of the bonded structure of the present invention in which the sealant and the sealer are used in combination. The illustrated bonded structure 11 has an adherend having a joint A as a discontinuous portion, namely, an adherend prepared by bonding a body panel 1 and a body panel 2 through the joint A by welding, and an adhesive/sealant composition (sealant) 3 which seals the joint A of the adherend. The joint A is further coated with a plastisol (sealer) 4 containing a plasticizer, and the plastisol 4 is at least partially overlapped onto the adhesive/sealant composition 3 to seal the joint A. The plastisol 4 and the adhesive/sealant composition 3 are overlapped each other within a boundary line B. Moreover, a coating layer 5 is applied to the surface of the bonded structure 11.

EXAMPLES

The present invention will be further explained with reference to the examples described below. Note that these examples are in no way limiting and that the present invention should not be restricted to these examples.

Example 1

First, the following vinyl type monomers and polymerization initiator were placed in a transparent jar and mixed:

(1) 15 parts by weight of n-butyl acrylate (n-BA);

(2) 85 parts by weight of 2-phenoxyethyl acrylate (2-POEA); and (3) 0.04 part by weight of 2,2-dimethoxy-1,2-diphenylethene-1-one, commercially available as "Irgacure™ 651", (trade name, manufactured by Ciba-Geigy).

The jar was then purged with nitrogen. The resultant mixture was subsequently irradiated with UV-rays using a UV-light source having a maximum intensity in the UV-region of 300 to 400 nm in wavelength to induce partial polymerization. The UV-ray irradiation was conducted at an output intensity of 1.76 mW/cm$^2$, and the vinyl type monomers were partially polymerized until the mixture showed a viscosity of about 3,000 mPa·s.

Next, while the partially polymerized products were being continuously stirred, the following components were added to give a precursor of an adhesive/sealant composition:

(4) 0.1 part by weight of 2,2-dimethoxy-1,2-diphenylethene-1-one, commercially available as "Irgacure™ 651";

(5) 3 parts by weight of glycidyl methacrylate (GMA);

(6) 50 parts by weight of thermosetting epoxy-containing material "Epikote 1001", (manufactured by Yuka Schell Epoxy K.K.) having an epoxy equivalent of about 500;

(7) 30 parts by weight of thermosetting epoxy-containing material "Epikote 828" (manufactured by Yuka Schell Epoxy K.K.) having an epoxy equivalent of about 190;

(8) 6 parts by weight of dicyandiamide;

(9) 2 parts by weight of 2,4-diamino-6-[2'-methylimidazolyl-(1')]-ethyl-s-triazine (2-MZA);

(10) 4 parts by weight of fused silica (trade name of "R-972", manufactured by Nihon Aerosol K.K.);

(11) 4 parts by weight of fine hollow glass balls (trade name of "Glass bubbles C15-250", manufactured by Minnesota Mining & Manufacturing);

(12) 0.2 part by weight of 3-mercaptopropionic acid (3-MPA); and, (13) 0.4 part by weight of polydimethylsiloxane (trade name of "TSF-451-1000", manufactured by Toshiba Silicone Co., Ltd.).

Next, a pair of silicone-treated polyethylene terephthalate (PET) films having a thickness of 50 μm were prepared. The precursor of adhesive/sealant composition having been prepared above was sandwiched between the PET films, and extended to have a thickness of 1.5 mm. The UV-light sources mentioned above were placed above and below the PET films, and the precursor was irradiated with UV-rays through the two PET films, thereby polymerizing the vinyl type monomers. The energy intensity of the UV-ray irradiation was 1,000 mJ/cm$^2$. When the two PET films were removed, a sheet-like adhesive/sealant composition having a thickness of 1.5 mm could be obtained. The adhesive/sealant composition had tackiness.

Example 2

A sheet-like adhesive/sealant composition was prepared in the same manner as in Example 1 except, that 20 parts by weight of n-butyl acrylate, 70 parts by weight of 2-phenoxyethyl acrylate and 10 parts by weight of isobornyl acrylate (IBXA) were used in place of (1) 15 parts by weight of n-butyl acrylate and (2) 85 parts by weight of 2-phenoxyethyl acrylate in Example 1.

Example 3

A sheet-like adhesive/sealant composition was prepared in the same manner as in Example 1 except that 35 parts by weight of n-butyl acrylate and 65 parts by weight of benzyl acrylate (BzA) were used in place of (1) 15 parts by weight of n-butyl acrylate and (2) 85 parts by weight of 2-phenoxyethyl acrylate in Example 1.

Comparative Example 1

A sheet-like adhesive/sealant composition was prepared in the same manner as in Example 1 except that 75 parts by weight of n-butyl acrylate and 25 parts by weight of N,N-dimethylacrylamide (NNDMA) were used in place of (1) 15 parts by weight of n-butyl acrylate and (2) 85 parts by weight of 2-phenoxyethyl acrylate in Example 1.

Comparative Example 2

A sheet-like adhesive/sealant composition was prepared in the same manner as in Example 1 except that 40 parts by weight of isooctyl acrylate (IOA) and 60 parts by weight of isobornyl acrylate were used in place of (1) 15 parts by weight of n-butyl acrylate and (2) 85 parts by weight of 2-phenoxyethyl acrylate in Example 1, and that 35 parts by weight of hydrogenated epoxy-containing material (epoxy equivalent of about 190, trade name of "RXE21", manufactured by Yuka Schell Epoxy K.K.) was used in place of (6) 50 parts by weight of "Epikote 1001" and (7) 30 parts by weight of "Epikote 828" in Example 1.

Table 1 shown below lists the compositions of the starting materials in the examples and comparative examples.

TABLE 1

| Starting Materials | Example 1 | Example 2 | Example 3 | Comp. Example 1 | Comp. Example 2 |
|---|---|---|---|---|---|
| n-BA | 15 | 20 | 35 | 75 | |
| IOA | | | | | 40 |
| GMA | 3 | 3 | 3 | 3 | 3 |
| NNDMA | | | | 25 | |
| IBXA | | 10 | | | 60 |
| 2-POEA | 85 | 70 | | | |
| BzA | | | 65 | | |
| Irgacure 651 | 0.14 | 0.14 | 0.14 | 0.14 | 0.14 |
| Epikote 1001 | 50 | 50 | 50 | 50 | |
| Epikote 828 | 30 | 30 | 30 | 30 | |
| RXE21 | | | | | 35 |
| Dicyandiamide | 6 | 6 | 6 | 6 | 6 |
| 2-MZA | 2 | 2 | 2 | 2 | 2 |
| R-972 | 4 | 4 | 4 | 4 | 4 |
| C15-250 | 4 | 4 | 4 | 4 | 4 |
| TSF-451-1000 | 0.4 | 0.4 | 0.4 | 0.4 | 0.4 |
| 3-MPA | 0.2 | 0.2 | 0.2 | 0.2 | 0.2 |

Example 4

The following tests and inspection were carried out on the adhesive/sealant compositions prepared in Examples 1 to 3 and Comparative Examples 1 and 2.

A. Step Absorbing (Sealing) Test

First, a flat glass plate of 150 mm long, 25 mm wide and 0.3 mm thick was partially stacked on a cold rolled steel plate of 150 mm long, 25 mm wide and 0.8 mm thick using a double-sided pressure-sensitive adhesive tape to give a test piece. The step where the steel strip fell to the flat glass plate simulated a joint at the bottom of a roof ditch of a vehicle. A rectangular sheet of 100 mm long and 20 mm wide was obtained by cutting the sheet of the uncured adhesive/sealant composition having been prepared. The rectangular sheet was arranged so that it covered the step of the test piece. The test piece was placed in a constant temperature oven, and was heated at 120° C. for 10 minutes, and further heated at 140° C. for 40 minutes, followed by cooling the test piece to room temperature. The simulated joint (represented by the step where the steel strip fell to the flat glass plate) was visually inspected through the flat glass plate, whereby simulation test in which the joint was sealed was conducted. The adhesive/sealant composition had been melted to flow along the longitudinal direction of the sheet, cover the steel strip and fill the gap between the flat glass plate surface and the steel strip surface. The seal was evaluated according to the degree to which the gap was filled, in accordance with the following five steps:

5 . . . excellent (gap being completely filled);
4 . . . good (gap being approximately completely filled);
3 . . . fair (gap being filled to an acceptable degree)
2 . . . poor (gap being incompletely filled); and
1 . . . not good (significant gap remaining).

The evaluation results thus obtained are shown below in Table 2.

B. Melting (Melt Flowing) Test

A cold rolled steel plate of 0.8 mm thick, 150 mm long and 65 mm wide having an electrodeposition coating of automobile grade (trade name of "E-coating U-600 Black", manufactured by Nippon Paint Co., Ltd.) was prepared. A rectangular sheet of 100 mm long and 20 mm wide was obtained by cutting the sheet of uncured adhesive/sealant composition having been prepared above. The sheet was then affixed to the cold rolled steel plate, and the steel plate was placed in a constant temperature oven, followed by heating it at 120° C. for 10 minutes. The heating simulated predrying of the adhesive/sealant composition in an automobile production line, which predrying is called precuring. The adhesive/sealant composition was subsequently cooled to room temperature, and whether the corners of the sheet of the adhesive/sealant composition disappeared or not was inspected. The evaluation was conducted according to the degree to which the sheet corners disappeared, in accordance with the following five steps:

5 . . . excellent (sheet corners becoming completely round);
4 . . . good (sheet corners becoming substantially completely round);

3 . . . fair (sheet corners becoming acceptably round);

2 . . . poor (sheet corners becoming insignificantly round); and

1 . . . not good (no round sheet corners being observed).

The evaluation results thus obtained are shown below in Table 2.

C. Visual Inspection of Coating

A test substrate was prepared as explained below. A cold rolled steel plate of 0.8 mm thick, 150 mm long and 65 mm wide having an electrodeposition coating of automobile grade (trade name of "E-coating U-600 Black", manufactured by Nippon Paint Co., Ltd.) was prepared. A rectangular sheet of 40 mm long and 20 mm wide was obtained by cutting the sheet of uncured adhesive/sealant composition having been prepared above. The rectangular sheet was then affixed to the cold rolled steel plate, and the steel plate was placed in a constant temperature oven, followed by heating it at 120° C. for 10 minutes. The heating simulated predrying of the adhesive/sealant composition in an automobile production line, which predrying is called precuring.

The rectangular sheet was then coated with aminoalkyd coat prepared by crosslinking polyester with melamine, using a bell type spray. Such aminoalkyd coat is called intermediate baking coat in the automotive industry. The rectangular sheet in such a state was then placed in a constant temperature oven, and heated at 140° C. for 30 minutes. The coating thickness of the intermediate baking coat was 40 μm. The rectangular sheet was then taken out from the oven, allowed to cool to room temperature, and coated with aminoalkyd type solid coat on the intermediate baking coat. Such anoalkyd type solid coat is called top baking coat in the automotive industry. The sheet was then placed in the constant temperature oven again, and heated at 140° C. for 30 minutes. The thickness of the top baking coat was then 40 μm. The sheet was then taken out of the oven, and allowed to cool to room temperature to give a test substrate.

The coat obtained above was visually inspected. The following 5 items were confirmed by the visual inspection:

(a) uniformity of the coat;

(b) no crawling;

(c) no orange peel;

(d) no wrinkle; and (e) no blisters.

The results were evaluated by five steps. That is, the coating was evaluated based on the following criteria: 5 points when all the five items (a) to (e) were satisfied; and 1 point when none of the five items were satisfied.

Further, the adhesive/sealant composition was left for 5 days at 40° C. and 90% relative humidity (RH) before precuring, and precured and coated as mentioned above; the coating was then visually inspected as mentioned above. Furthermore, the adhesive/sealant composition having been left for 5 days at 40° C. and 90% RH after precuring and before coating was coated as mentioned above, and visually inspected. These inspections were conducted because expected moisture absorption of the adhesive/sealant composition in an automobile production line was taken into consideration. In the former inspection, moisture absorption of the adhesive/sealant composition due to allowing the affixed adhesive/sealant composition to stand immediately after affixing it to the steel plate (being allowed to stand) was expected. In the latter inspection, cases where the production line was stopped after precuring as mentioned above and the adhesive/sealant composition was allowed to stand and absorb moisture were expected. The results thus obtained are shown in Table 2.

D. Adhesion Test of Coating

The same test substrate as used in the visual inspection test of coating was prepared. A so-called "cross-cut adhesion test" was subsequently conducted in accordance with Japan Industrial Standard (JIS) K5400. That is, a lattice pattern formed with 25 squares each 1 mm long and 1 nm wide was formed by shallowly cutting the coating and adhesive/sealant composition with a razor. "Cellotape" (trade name, manufactured by Nichiban K.K.) was then affixed to the coating surface, and peeled off at a breath. The adhesion of the coating was evaluated by counting the number of remaining squares of the lattice pattern. Table 2 shown below exhibits the number of remaining squares of the lattice pattern relative to all the initial squares. The cross-cut adhesion test was also conducted on the same type test substrate after immersing it in warm water at 40° C. for 250 hours. The evaluation results thus obtained are shown in Table 2.

E. Plasticizer Resistance Test

The same cold rolled steel plate and sheet-like adhesive/sealant composition as used in the visual inspection of coating as explained above were prepared. Moreover, a liquid sealer of vinyl chloride plastisol was prepared by mixing 20 parts by weight of a resin for polyvinyl chloride paste (trade name of "G121", manufactured by Nippon Zeon Co., Ltd.), 20 parts by weight of a resin for a vinyl chloride blend (trade name of "G103ZX", manufactured by Nippon Zeon Co., Ltd.), 30 parts by weight of a plasticizer (trade name of "Sansocizer DOP", manufactured by Shinnihon Rika K.K.) containing di(2-ethylhexyl) phthalate and 45 parts by weight of a filler composed of calcium carbonate.

Next, the adhesive/sealant composition was affixed to the cold rolled steel plate, and the liquid sealer was applied to the adhesive/sealant composition. The liquid sealer had a coating thickness of 0.5 mm in the lap portion where the liquid sealer overlapped onto the adhesive/sealant composition and 2 mm in the portion other than the lap portion mentioned above.

The adhesive/sealant composition in such a state was placed in an oven, heated at 120° C. for 10 minutes to be precured, and subsequently heated at 140° C. for 60 minutes. The adhesive/sealant composition was then allowed to cool to room temperature in the oven over 24 hours, and it was further held at 80° C. for 250 hours in the oven to make heat aging. The adhesive/sealant composition was then cooled to room temperature, and visually inspected. The visual inspection was conducted at the interface between the adhesive/sealant composition and the liquid sealer. In particular, the presence or absence of poor adhesion at the interface, delamination and cracks at the interface edge was confirmed, and judged in accordance with the following five steps:

5 . . . excellent (complete interfacial state);

4 . . . good (approximately complete interfacial state);

3 . . . fair (acceptable interfacial state);

2 . . . poor (poor adhesion and cracks being present); and

1 . . . not good (significantly poor adhesion and cracks being present).

The results thus obtained are shown below in Table 2.

TABLE 2

| Evaluation Item | Example 1 | Example 2 | Example 3 | Comp. Example 1 | Comp. Example 2 |
|---|---|---|---|---|---|
| Step absorbing (sealing) | 5 | 5 | 5 | 5 | 5 |
| Melting (melt flowing) | 5 | 5 | 5 | 5 | 5 |
| Visual inspection of coating | | | | | |
| initial | 5 | 5 | 5 | 5 | 5 |
| moisture absorption 1* | 5 | 5 | 5 | 2 | —*** |
| moisture absorption 2** | 5 | 5 | 5 | 1 | —*** |
| Adhesion test of coating (cross-cut adhesion test) | | | | | |
| initial | 25/25 | 25/25 | 25/25 | 25/25 | 0/25 |
| after immersion in warm water | 25/25 | 25/25 | 25/25 | 25/25 | 0/25 |
| Plasticizer resistance test lap portion with PVC sealer | 5 | 5 | 5 | 1 | 1 |

Note:
*moisture absorption of the adhesive/sealant composition (being allowed to stand as sol)
**moisture absorption of the adhesive/sealant composition (after precuring)
***no coating is formed It is understood from the evaluation results listed in Table 2 that the adhesive/sealant compositions in Examples 1 to 3 all satisfy the tests and inspections mentioned above. In contrast, it is understood that neither of the adhesive/sealant compositions in Comparative Examples 1 nor 2 satisfy them. Accordingly, it is understood that the adhesive/sealant composition according to the present invention protects against deterioration caused by the migration of the plasticizer to the interface while decreasing its moisture absorption and thus, sealing a discontinuous portion effectively, and that the adhesive/sealant composition can provide a desired appearance by the additional use of a coating.

Example 5

In the present example, the following vinyl type monomers and polymerization initiator were placed in the transparent jar mentioned above and mixed:

(1) 80 parts by weight of 2-phenoxyethyl acrylate;
(2) 20 parts by weight of benzyl acrylate; and
(3) 0.04 part by weight of 2,2-dimethoxy-1,2-diphenylethene-1-one, commercially available as "Irgacure™ 651" (manufactured by Ciba-Geigy). The jar was then purged with nitrogen. The resultant mixture was subsequently irradiated with UV-rays using the same UV-light sources as explained in Example 1 to effect partial polymerization of the vinyl type monomers. Such UV-ray irradiation was conducted at an output intensity of 1.76 mW/cm$^2$, and the vinyl type monomers were partially polymerized until the mixture showed a viscosity of about 3,000 mPa·s.

Next, while the mixture was being continuously stirred, the following components were added to give a precursor of an adhesive/sealant composition:

(4) 0.1 part by weight of 2,2-dimethoxy-1,2-diphenylethene-1-one, commercially available as "Irgacure™ 651";

(5) 0.05 part by weight of 1,6-hexanediol diacrylate (HDDA);
(6) 25 parts by weight of thermosetting epoxy-containing material "Epikote 1001", having an epoxy equivalent of about 500;
(7) 45 parts by weight of thermosetting epoxy-containing material "Epikote 828", having an epoxy equivalent of about 190;
(8) 7 parts by weight of dicyandiamide;
(9) 1.2 parts by weight of 2-MZA (manufactured by Shikoku Corporation); and
(10) 8 parts by weight of fused silica (trade name of "R-972", manufactured by Nihon Aerosol K.K.)

Next, a pair of silicone-treated polyethylene terephthalate (PET) films having a thickness of 50 μm were prepared. The precursor of adhesive/sealant composition having been prepared above was sandwiched between the PET films, and extended to have a thickness of 1.2 mm. The UV-light sources mentioned above were placed above and below the PET films, and the precursor was irradiated with UV-rays through the two PET films, thereby polymerizing the vinyl type monomers. The energy intensity of the UV-ray irradiation was 1,000 mJ/cm$^2$. When the two PET films were removed, the adhesive/sealant composition having a thickness of 1.2 mm could be obtained.

Example 6

An adhesive/sealant composition was prepared in the same manner as in Example 5 except that 94 parts by weight of 2-phenoxyethyl acrylate and 6 parts by weight of isobornyl acrylate were used in place of (1) 80 parts by weight of 2-phenoxyethyl acrylate and (2) 20 parts by weight of benzyl acrylate in Example 5.

Example 7

An adhesive/sealant composition was prepared in the same manner as in Example 5 except that 6 parts by weight of 2-ethylhexyl acrylate, 75 parts by weight of 2-phenoxyethyl acrylate, 15 parts by weight of benzyl acrylate, 4 parts by weight of isobornyl acrylate and 50 parts by weight of "Epikote 828" were used in place of (1) 80 parts by weight of 2-phenoxyethyl acrylate, (2) 20 parts by weight of benzyl acrylate and (7) 45 parts by weight of Epikote 828.

Comparative Example 3

An adhesive/sealant composition was prepared in the same manner as in Example 5 except that 71 parts by weight of n-butyl acrylate and 29 parts by weight of N-vinylcaprolactam (NVC) were used in place of (1) 80 parts by weight of 2-phenoxyethyl acrylate and (2) 20 parts by weight of benzyl acrylate in Example 5.

Comparative Example 4

An adhesive/sealant composition was prepared in the same manner as in Example 5 except that 64 parts by weight of butyl acrylate and 36 parts by weight of isobornyl acrylate were used in place of (1) 80 parts by weight of 2-phenoxyethyl acrylate and (2) 20 parts by weight of benzyl acrylate in Example 5.

Table 3 shown below lists the compositions of the starting materials in each of the examples and comparative examples.

TABLE 3

| Starting Materials | Example 5 | Example 6 | Example 7 | Comp. Example 3 | Comp. Example 4 |
|---|---|---|---|---|---|
| n-BA | | | | 71.0 | 64.0 |
| 2-EHA | | | 6.0 | | |
| 2-POEA | 80.0 | 94.0 | 75.0 | | |
| BzA | 20.0 | | 15.0 | | |
| IBXA | | 6.0 | 4.0 | | 36.0 |
| NVC | | | | 29.0 | |
| IRGACURE 651 | 0.14 | 0.14 | 0.14 | 0.14 | 0.14 |
| HDDA | 0.05 | 0.05 | 0.05 | 0.05 | 0.05 |
| Epikote 1001 | 25.0 | 25.0 | 25.0 | 25.0 | 25.0 |
| Epikote 828 | 45.0 | 45.0 | 50.0 | 45.0 | 45.0 |
| Dicyandiamide | 7.0 | 7.0 | 7.0 | 7.0 | 7.0 |
| 2-MZA | 1.2 | 1.2 | 1.2 | 1.2 | 1.2 |
| R-972 | 8.0 | 8.0 | 8.0 | 8.0 | 8.0 |

Example 8

The following tests were conducted on the adhesive/sealant compositions prepared in Examples 5 to 7 and Comparative Examples 3 and 4, which were each used in combination with the liquid sealer of vinyl chloride sol mentioned above.

A. Bonding Test on Sealer

Figure 6:
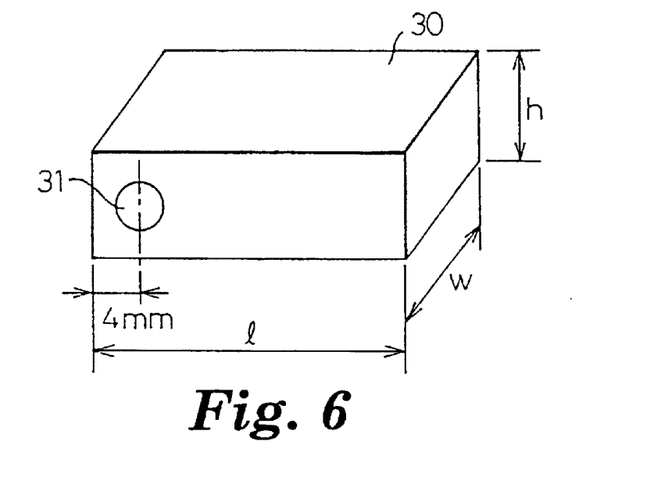
FIG. 6 is a perspective view showing a molded article used as a testing jig in the evaluation test in Example 8.

As shown in FIG. 6, a polybutylene terephthalate (PBT) resin commercially available as "Torafan" (trade name, manufactured by Toray Industries Inc.) was injection molded to give a molded article 30 having a length (l) of 20 mm, a width (w) of 10 mm and a height (h) of 5 mm. A through hole 31 of 2 mm in diameter was formed which was 4 mm from one end of the side surface in the longitudinal direction of the molded article. A rectangular sheet 23 having a length of 20 mm and a width of 9 mm was obtained by cutting the sheet of an adhesive/sealant composition. The rectangular sheet 23 was affixed to the bottom of the molded article 30, and contact bonded with a roller having a weight of 2 kg.

Figure 7:
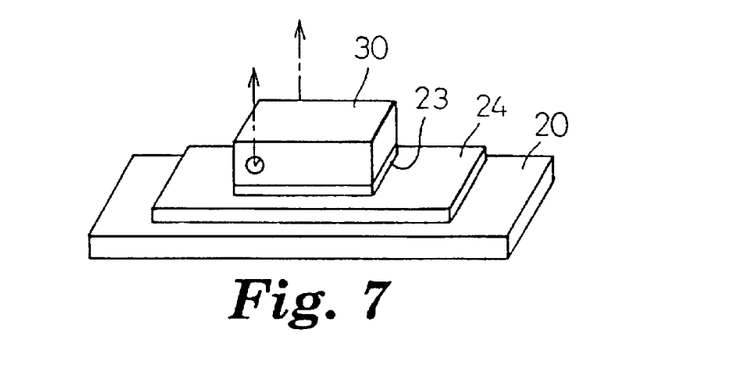
FIG. 7 is a perspective view illustrating the method of bonding test on sealer conducted in Example 8.

As shown in FIG. 7, a cold rolled steel plate 20 of 75 mm long, 25 mm wide and 0.8 mm thick having an electrodeposition coating of automobile grade was prepared. A liquid sealer 24 of the vinyl chloride plastisol having been prepared above was applied to one surface of the cold rolled plate to have a film thickness of 0.5 mm.

The molded article 30 was then placed on the cold rolled steel plate 20 through the liquid sealer 24 and the rectangular sheet 23 of the adhesive/sealant composition, and a load of 1 kg was applied to the molded article 30 for 1 sec to give a first test precursor. The first test precursor was placed in a constant temperature oven, heated at 110° C. for 10 minutes, and allowed to cool to room temperature. The first precursor was subsequently heated at 130° C. over 40 minutes, and allowed to cool to room temperature again to give a first specimen.

A second specimen was prepared in the same manner as in the preparation of the first specimen, as explained below. That is, a cold rolled steel plate coated with the liquid sealer at 0.5 mm thick was placed in a constant temperature oven, heated at 110° C. for 10 minutes, and subsequently allowed to cool to room temperature, followed by affixing the cold rolled steel plate to the molded article through the adhesive/sealant composition to give a second test precursor. The liquid sealer in such a state was placed in an oven, heated at 135° C. for 40 minutes, and allowed to cool to room temperature to give a second specimen.

Next, as shown in FIG. 7 a string (referred to as a dotted line) was passed through the through hole 31 of the first or the second specimen, and the specimen was subjected to a tensile test in the direction of the arrow using a tensile tester available from Shimazu Corporation (Kyoto, Japan) under the trade name of "Autograph AGS-100D" to determine a tensile load (N). The tensile test was carried out at a stretching rate of 300 mm/min.

The above test was also carried out on the first and second specimens after heat aging of the specimens. The first and the second specimens were placed in a constant temperature oven adjusted to 30° C. and 80% RH, and left there for 10 days to be heat aged. The test results thus obtained are shown along with the destruction mode in Table 4.

B. Holding Power Test on Sealer

Figure 8:
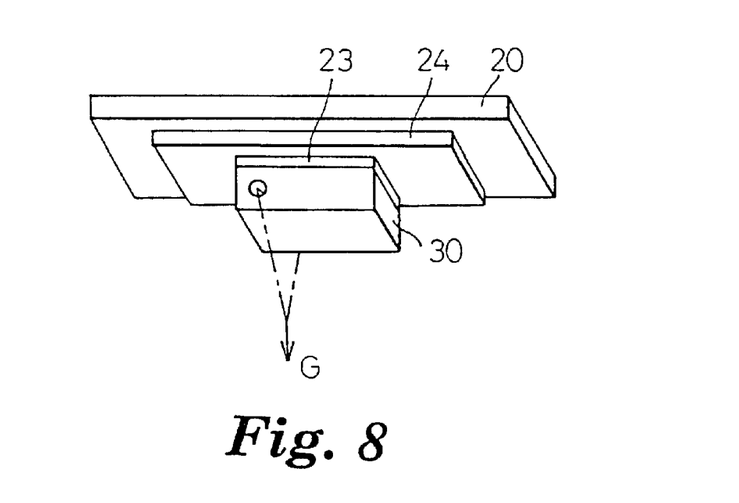
FIG. 8 is a perspective view illustrating the method of holding power test on sealer conducted in Example 8.

As shown in FIG. 8, a weight G of 2 kg was applied to the molded article of the first or second specimen described above through a string (referred to as a dotted line), and the holding power of the rectangular sheet 23 of the adhesive/sealant composition was evaluated. The specimens were also evaluated after heat aging. The heat aging conditions were the same as in the above-described bonding test on sealer. The test results thus obtained are shown below in Table 4.

TABLE 4

| Evaluation Item | Specimen | Ex. 5 | Ex. 6 | Ex. 7 | Comp. Ex. 3 | Comp. Ex. 4 |
|---|---|---|---|---|---|---|
| Bonding test on VC sealer (unit: N) without heat aging | First | 145 MAD | 120 MAD | 152 MAD | 178 MAD | 135 VC/AC-D |
| | Second | 125 VC/AC-D | 120 ACD | 135 MAD | 145 VC/AC-D | 101 VC/AC-D |
| Bonding test on VC sealer (unit: N) with heat aging 30° C., 80% RH, after 10 days | First | 135 MAD | 130 MAD | 84 MAD | 178 VC/AC-D | 55 VC/AC-D |
| | Second | 110 VC/AC-D | 135 VC/AC-D | 125 VC/AC-D | 87 VC/AC-D | 85 VC/AC-D |
| Holding power test on VC sealer (unit: day) Without heat aging | First | held ≧1 day | held ≧1 day | Held ≧1 day | held ≧1 day | <1 day |
| | Second | held ≧1 day | held ≧1 day | held ≧1 day | held ≧1 day | dropped directly after test |
| Holding power test on VC sealer unit: day) with heat aging 30° C., 80% RH, after 10 days | First | held ≧1 day | held ≧1 day | Held ≧1 day | <1 day | dropped directly after test |
| | Second | held ≧1 day | held ≧1 day | held ≧1 day | <1 day | dropped directly after test |

Note:
VC . . . vinyl chloride
MAD . . . destruction of the molded article
VC/AC-D . . . destruction of the vinyl chloride sealer/adhesive It is understood from the test results in Table 4 that the adhesive/sealant compositions of Examples 5 to 7 maintained high bondability onto the sealer in the bonding test regardless of whether or not heat aging is conducted. On the other hand, it is seen that the adhesive/sealant compositions in Comparative Examples 3 and 4 markedly lower their strength after heat aging.

Furthermore, it is understood that in the holding power test of the, adhesive/sealant composition onto the sealer, the adhesive/sealant compositions of Examples 5 to 7 hold the weight (2 kg) for at least one day regardless of whether or not heat aging is conducted. In contrast, it is seen that the adhesive/sealant compositions in the comparative examples cannot hold the weight for at least one day except the one prior to heat aging in Comparative Example 3. In particular, the holding power of the adhesive/sealant composition in Comparative Example 4 is low both prior to and subsequent to heat aging, and the molded article drops simultaneously with the application of the weight.

It is understood from the above facts that the adhesive/sealant compositions of Examples 5 to 7 according to the present invention have excellent bondability and holding power with the liquid sealer as mentioned above.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein as follows.

What is claimed is:

1. A bonded structure comprising:
   an adherend having a discontinuous portion, and
   an adhesive/sealant composition which seals the discontinuous portion of the adherend, wherein the adhesive/sealant composition comprises:
   a radiation-polymerizable vinyl material containing a vinyl type monomer capable of exhibiting a solubility parameter of 10 to 12 $(cal/cm^3)^{0.5}$ determined according to the R.F. Fedors technique when the vinyl type monomer is polymerized to a homopolymer,
   a polymerization initiator for radiation polymerization of the vinyl material,
   a thermosetting epoxy-containing material, and
   a heat-activatable hardener for the epoxy-containing material;
   said discontinuous portion comprising overlapping first and second portions of the adherend.

2. The bonded structure according claim 1, further comprising a plasticizer-containing plastisol applied over at least a portion of the discontinuous portion, wherein the plastisol is at least partially overlapped by the adhesive/sealant composition to seal the discontinuous portion.

3. The bonded structure according claim 1, wherein the adherend comprises a roof ditch of a vehicle.

4. The bonded structure according claim 3, further comprising a coating layer over the adhesive/sealant composition.

5. The bonded structure according claim 2, wherein the adherend comprises a roof ditch of a vehicle.

6. The bonded structure according claim 5, further comprising a U-shaped clip in contact with the adhesive/sealant composition.

7. The bonded structure according claim 6, further comprising a roof molding at least a portion of which is fitted into the U-shaped clip.

8. The bonded structure according claim 5, further comprising a U-shaped clip in contact with the adhesive/sealant composition and the plasticizer-containing plastisol.

9. The bonded structure according claim 5, further comprising a coating layer over the adhesive/sealant composition, wherein the coating layer contacts at least a portion of the adhesive/sealant composition and the plasticizer-containing plastisol.

10. The bonded structure according claim 4, wherein the coating layer comprises an aminoalkyd coating material.

11. The bonded structure according claim 1, wherein the adhesive/sealant composition comprises:
    at least one radiation-polymerizable vinyl material;
    at least one thermosetting epoxy-containing material;
    a polymerization initiator consisting of 2,2-dimethoxy-1,2-diphenylethan-1-one;
    at least one optional chain transfer agent selected from the group consisting of carbon tetrachloride, lauryl mercaptan, butyl mercaptan, ethanethiol, 2-mercaptoether and 3-mercaptopropionic acid;
    at least one heat-activatable hardener selected from the group consisting of dicyandiamide, adipic acid dihydrazide, phthalic anhydride, trimellitic anhydride, pyromellitic anhydride, monoethylamine of boron trifluoride, piperidine of boron trifluoride, 2,4-diamino-6-[2'-methylimidazole-(1')]-ethyl-s-triazine, 2,4-diamino-6-[2'-methylimidazole-(1')]-ethyl-s-triazine-isocyanurate, 2-phenyl-4-benzyl-5-hydroxyethylimidazole, nickel imidazole phthalate, 3-phenyl-1,1-dimethyl urea, 3-p-chlorophenyl-1,1-dimethyl urea; and
    at least one optional filler selected from the group consisting of calcium carbonate, silica, alumina, a phthalic acid derivative plasticizer, an adipic acid derivative, liquid rubber; an antioxidant, a surfactant, polydimethylsiloxane, a woven prepared from at least one of polyester, nylon, cotton, polypropylene, cellulose acetate and acetate fibers, and a unwoven fabric prepared from at least one of polyester, nylon, cotton, polypropylene, cellulose acetate and acetate fibers.

12. The bonded structure according claim 11, wherein the vinyl type monomer is selected from the group consisting of 2-phenoxyethyl acrylate, benzyl acrylate, phenyl acrylate, phenylethyl acrylate, dicyclopentenyl acrylate, dicyclopentenyloxyethyl acrylate, tricyclo[5,2,1]decanyl acrylate, tricyclo[5,2,1]decanyl methacrylate tricyclo[5,2,1]decanyl (meth)acrylate, and mixtures thereof.

13. The bonded structure according claim 12, wherein the vinyl type monomer is selected from the group consisting of 2-phenoxyethyl acrylate, benzyl acrylate and phenyl acrylate.

14. The bonded structure according claim 11, wherein the thermosetting epoxy-containing material is selected from the group consisting of a bisphenol A type epoxy resin, a bisphenol AD type epoxy resin, a disphenol F type epoxy resin, a phenol novolac type epoxy resin, a cresol novolac type epoxy resin, an alycyclic epoxy resin, a heterocyclic ring-containing epoxy resin, an aromatic or aliphatic epoxy resin, an epoxy resin obtained by the reaction of an alicyclic carboxylic acid and epichlorohydrin, a spiro ring-containing epoxy resin, a glycidyl ether type epoxy resin which is a reaction product of an o-allylphenol novolac compound with epichlorohydrin and a glycidyl ether type epoxy resin which is a reaction product of a diallylbisphenol compound having allyl groups located at positions ortho to the respective hydroxyl groups of bisphenol A with epichlorohydrin.

15. A bonded structure comprising a roof ditch having a discontinuous portion, and an adhesive/sealant composition which seals the discontinuous portion of the roof ditch, wherein the adhesive/sealant composition comprises:
    a radiation-polymerizable vinyl material containing a vinyl type monomer capable of exhibiting a solubility parameter of 10 to 12 $(cal/cm^3)^{0.5}$ determined according to the R.F. Fedors technique when the vinyl type monomer is polymerized to a homopolymer,
    a polymerization initiator for radiation polymerization of the vinyl material, a thermosetting epoxy-containing material, and a heat-activatable hardener for the epoxy-containing material;

said discontinuous portion comprising overlapping first and second portions of the roof ditch.

16. The bonded structure according claim 15, wherein the adhesive/sealant composition consists essentially of:

at least one radiation-polymerizable vinyl material;

at least one thermosetting epoxy-containing material;

a polymerization initiator consisting of 2,2-dimethoxy-1, 2-diphenylethan-1-one;

at least one optional chain transfer agent selected from the group consisting of carbon tetrachloride, lauryl mercaptan, butyl mercaptan, ethanethiol, 2-mercaptoether and 3-mercaptopropionic acid;

at least one heat-activatable hardener selected from the group consisting of dicyandiamide, adipic acid dihydrazide, phthalic anhydride, trimellitic anhydride, pyromellitic anhydride, monoethylamine of boron trifluoride, piperidine of boron trifluoride, 2,4-diamino-6-[2'-methylimidazole-(1')]-ethyl-s-triazine, 2,4-diamino-6-[2'-methylimidazole-(1')]-ethyl-s-triazine-isocyanurate, 2-phenyl-4-benzyl-5-hydroxyethylimidazole, nickel imidazole phthalate, 3-phenyl-1,1-dimethyl urea, 3-p-chlorophenyl-1,1-dimethyl urea; and at least one optional filler selected from the group consisting of calcium carbonate, silica, alumina, aphthalic acid derivative plasticizer, an adipic acid derivative, liquid rubber; an antioxidant, a surfactant, polydimethylsiloxane, a woven prepared from at least one of polyester, nylon, cotton, polypropylene, cellulose acetate and acetate fibers, and a unwoven fabric prepared from at least one of polyester, nylon, cotton, polypropylene, cellulose acetate and acetate fibers.

17. The bonded structure according claim 16, further comprising a plasticizer-containing plastisol applied over at least a portion of the discontinuous portion, wherein the plastisol is at least partially overlapped by the adhesive/sealant composition to seal the discontinuous portion.

18. The bonded structure according claim 17, further comprising a coating layer over the adhesive/sealant composition.

19. A bonded structure comprising a roof ditch having a discontinuous portion, and an adhesive/sealant composition which seals the discontinuous portion of the roof ditch, wherein the adhesive/sealant composition consists essentially of:

at least one radiation-polymerizable vinyl material;

at least one thermosetting epoxy-containing material;

a polymerization initiator consisting of 2,2-dimethoxy-1, 2-diphenylethan-1-one;

at least one optional chain transfer agent selected from the group consisting of carbon tetrachloride, lauryl mercaptan, butyl mercaptan, ethanethiol, 2-mercaptoether and 3-mercaptopropionic acid;

at least one heat-activatable hardener selected from the group consisting of dicyandiamide, adipic acid dihydrazide, phthalic anhydride, trimellitic anhydride, pyromellitic anhydride, monoethylamine of boron trifluoride, piperidine of boron trifluoride, 2,4-diamino-6-[2'-methylimidazole-(1')]-ethyl-s-triazine, 2,4-diamino-6-[2'-methylimidazole-(1')]-ethyl-s-triazine-isocyanurate, 2-phenyl-4-benzyl-5-hydroxyethylimidazole, nickel imidazole phthalate, 3-phenyl-1,1-dimethyl urea, 3-p-chlorophenyl-1,1-dimethyl urea; and at least one optional filler selected from the group consisting of calcium carbonate, silica, alumina, a phthalic acid derivative plasticizer, an adipic acid derivative, liquid rubber; an antioxidant, a surfactant, polydimethylsiloxane, a woven prepared from at least one of polyester, nylon, cotton, polypropylene, cellulose acetate and acetate fibers, and a unwoven fabric prepared from at least one of polyester, nylon, cotton, polypropylene, cellulose acetate and acetate fibers.

20. The bonded structure according claim 19, further comprising a plasticizer-containing plastisol applied over at least a portion of the discontinuous portion, wherein the plastisol is at least partially overlapped by the adhesive/sealant composition to seal the discontinuous portion.

* * * * *

UNITED STATES PATENT AND TRADEMARK OFFICE
CERTIFICATE OF CORRECTION

PATENT NO.     : 6,656,979 B1
DATED          : December 2, 2003
INVENTOR(S)    : Kitano, Shuichi It is certified that error appears in the above-identified patent and that said Letters Patent is hereby corrected as shown below:

Column 4,
Line 57, insert -- . -- following "thereof";

Column 5,
Line 56, insert -- - -- (hyphen) following "6" and preceeding "hexanediol";

Column 6,
Line 50, delete "permolecule", insert in place thereof -- per molecule --;

Column 7,
Lines 30 and 37, delete "BrOnsted", insert in place thereof -- Bronsted --;

Column 9,
Line 56, deelte "." after "clip";

Column 13,
Line 31, delete "anoalkyd", insert in place thereof -- aminoalkyd --;

Column 18,
Line 56, insert -- composition interface --; below that insert
-- ACD………..destruction of the adhesive/sealant composition sheet --.

Signed and Sealed this

Eleventh Day of May, 2004

JON W. DUDAS
*Acting Director of the United States Patent and Trademark Office*